United States Patent
Kaiser et al.

(10) Patent No.: US 9,736,437 B2
(45) Date of Patent: Aug. 15, 2017

(54) DEVICE FOR ACQUIRING BIMODAL IMAGES

(71) Applicant: Photonis France, Brive (FR)

(72) Inventors: Carlo Kaiser, Roden (NL); Franck Robert, Brive la Gaillarde (FR); Damien Letexier, Gometz le Châtel (FR)

(73) Assignee: PHOTONIS FRANCE, Brive (FR)

( * ) Notice: Subject to any disclaimer, the term of this patent is extended or adjusted under 35 U.S.C. 154(b) by 0 days.

(21) Appl. No.: 14/785,037

(22) PCT Filed: Apr. 16, 2014

(86) PCT No.: PCT/EP2014/057698
§ 371 (c)(1),
(2) Date: Oct. 16, 2015

(87) PCT Pub. No.: WO2014/170359
PCT Pub. Date: Oct. 23, 2014

(65) Prior Publication Data
US 2016/0080706 A1     Mar. 17, 2016

(30) Foreign Application Priority Data

Apr. 17, 2013 (FR) .................................. 13 53482

(51) Int. Cl.
*H04N 9/04* (2006.01)
*H04N 5/232* (2006.01)
(Continued)

(52) U.S. Cl.
CPC ........... *H04N 9/045* (2013.01); *G06T 3/4015* (2013.01); *H04N 5/23229* (2013.01);
(Continued)

(58) Field of Classification Search
None
See application file for complete search history.

(56) References Cited

U.S. PATENT DOCUMENTS 3,971,065 A     7/1976   Bayer
5,914,749 A *   6/1999   Bawolek ........... H01L 27/14621
                                                    257/E27.134
(Continued)

FOREIGN PATENT DOCUMENTS

JP     2010-062604 A     3/2010
WO     2007/089416 A1    8/2007
WO     2007/145373 A1    12/2007

OTHER PUBLICATIONS

David Alleysson et al., "Frequency selection demosaicking: A review and a look ahead" Proc. of IS&T/SPIE VCIP, Jan. 2008.
(Continued)

*Primary Examiner* — Justin P Misleh
(74) *Attorney, Agent, or Firm* — Pearne & Gordon, LLP (57) ABSTRACT

The invention relates to an image acquisition device comprising a sensor composed of an array of photosensitive pixels, and an array of elementary filters covering the sensor. Pixels may be of three different types: panchromatic pixels, primary colour pixels and infrared pixels. Under low illumination conditions, the device displays a monochrome image using panchromatic pixels, and under high illumination conditions, a colour image with a high signal to noise ratio, by combining primary colour images and subtracting the infrared image.

18 Claims, 9 Drawing Sheets

| W | R | W | G | W | R | W | G |
|---|---|---|---|---|---|---|---|
| R | W | IR | W | R | W | IR | W |
| W | G | W | B | W | G | W | B |
| IR | W | B | W | IR | W | B | W |
| W | R | W | G | W | R | W | G |
| R | W | IR | W | R | W | IR | W |
| W | G | W | B | W | G | W | B |
| IR | W | B | W | IR | W | B | W |

(51) Int. Cl.
*H04N 5/33* (2006.01)
*G06T 3/40* (2006.01)

(52) U.S. Cl.
CPC ....... *H04N 5/332* (2013.01); *H04N 2209/045* (2013.01); *H04N 2209/046* (2013.01); *H04N 2209/047* (2013.01)

(56) References Cited

U.S. PATENT DOCUMENTS

| | | | | |
|---|---|---|---|---|
| 6,211,521 B1* | 4/2001 | Bawolek | ................ | G02B 5/201 |
| | | | | 250/208.1 |
| 2006/0044427 A1* | 3/2006 | Hu | ........................... | H04N 9/07 |
| | | | | 348/266 |
| 2007/0285540 A1 | 12/2007 | Kwon | | |
| 2009/0009654 A1 | 1/2009 | Imai | | |
| 2009/0159799 A1 | 6/2009 | Copeland | | |
| 2009/0295973 A1 | 12/2009 | Oshikubo | | |
| 2010/0289885 A1* | 11/2010 | Lu | ........................ | H04N 5/2258 |
| | | | | 348/61 |
| 2012/0140099 A1* | 6/2012 | Kim | ........................ | H04N 9/045 |
| | | | | 348/279 |
| 2013/0242148 A1* | 9/2013 | Mlinar | .................. | H04N 9/045 |
| | | | | 348/279 |
| 2014/0084135 A1* | 3/2014 | Chen | .................. | H01L 27/1464 |
| | | | | 250/208.1 |

OTHER PUBLICATIONS

Shraddha Tripathi et al., "Image Segmentation: A Review", International Journal of Computer Science and Management Research, vol. 1, Issue 4, Nov. 2012.
Search Report issued in French Patent Application No. FR 13 53482 dated Sep. 23, 2013.
International Search Report issued in Application No. PCT/EP2014/057698 dated Jun. 4, 2014.
Written Opinion issued in Application No. PCT/EP2014/057698 dated Jun. 4, 2014.

* cited by examiner

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

Fig. 1

PRIOR ART

| W | B | W | G | W | B | W | G |
|---|---|---|---|---|---|---|---|
| B | W | G | W | B | W | G | W |
| W | G | W | R | W | G | W | R |
| G | W | R | W | G | W | R | W |
| W | B | W | G | W | B | W | G |
| B | W | G | W | B | W | G | W |
| W | G | W | R | W | G | W | R |
| G | W | R | W | G | W | R | W |

Fig. 2
PRIOR ART

| R | W | G | W | R | W | G | W |
|---|---|---|---|---|---|---|---|
| W | W | W | W | W | W | W | W |
| IR | W | B | W | IR | W | B | W |
| W | W | W | W | W | W | W | W |
| R | W | G | W | R | W | G | W |
| W | W | W | W | W | W | W | W |
| IR | W | B | W | IR | W | B | W |
| W | W | W | W | W | W | W | W |

Fig. 3A

| Ye | W | Ma | W | Ye | W | Ma | W |
|----|---|----|---|----|---|----|---|
| W  | W | W  | W | W  | W | W  | W |
| IR | W | Cy | W | IR | W | Cy | W |
| W  | W | W  | W | W  | W | W  | W |
| Ye | W | Ma | W | Ye | W | Ma | W |
| W  | W | W  | W | W  | W | W  | W |
| IR | W | Cy | W | IR | W | Cy | W |
| W  | W | W  | W | W  | W | W  | W |

Fig. 3B

| W | R | W | G | W | R | W | G |
|---|---|---|---|---|---|---|---|
| R | W | IR | W | R | W | IR | W |
| W | G | W | B | W | G | W | B |
| IR | W | B | W | IR | W | B | W |
| W | R | W | G | W | R | W | G |
| R | W | IR | W | R | W | IR | W |
| W | G | W | B | W | G | W | B |
| IR | W | B | W | IR | W | B | W |

Fig. 4A

| W | Ye | W | Ma | W | Ye | W | Ma |
|---|----|---|----|---|----|---|----|
| Ye | W | IR | W | Ye | W | IR | W |
| W | Ma | W | Cy | W | Ma | W | Cy |
| IR | W | Cy | W | IR | W | Cy | W |
| W | Ye | W | Ma | W | Ye | W | Ma |
| Ye | W | IR | W | Ye | W | IR | W |
| W | Ma | W | Cy | W | Ma | W | Cy |
| IR | W | Cy | W | IR | W | Cy | W |

DEVICE FOR ACQUIRING BIMODAL IMAGES

TECHNICAL FIELD

This invention relates to the field of image acquisition devices, especially devices using colour array filters.

STATE OF PRIOR ART

Most image acquisition devices such as digital still and video cameras use a sensor (CCD or CMOS) composed of an array of elementary photosensitive sensors also called pixels. Colour information is obtained through an elementary Colour Filter Array (CFA) placed on the array of pixels such that each pixel is covered by an elementary filter of the array, allowing only part of the visible spectrum to pass.

A large amount of research has been carried out on colour filter arrays and techniques for image reconstruction from signals received by the different pixels.

Figure 1:
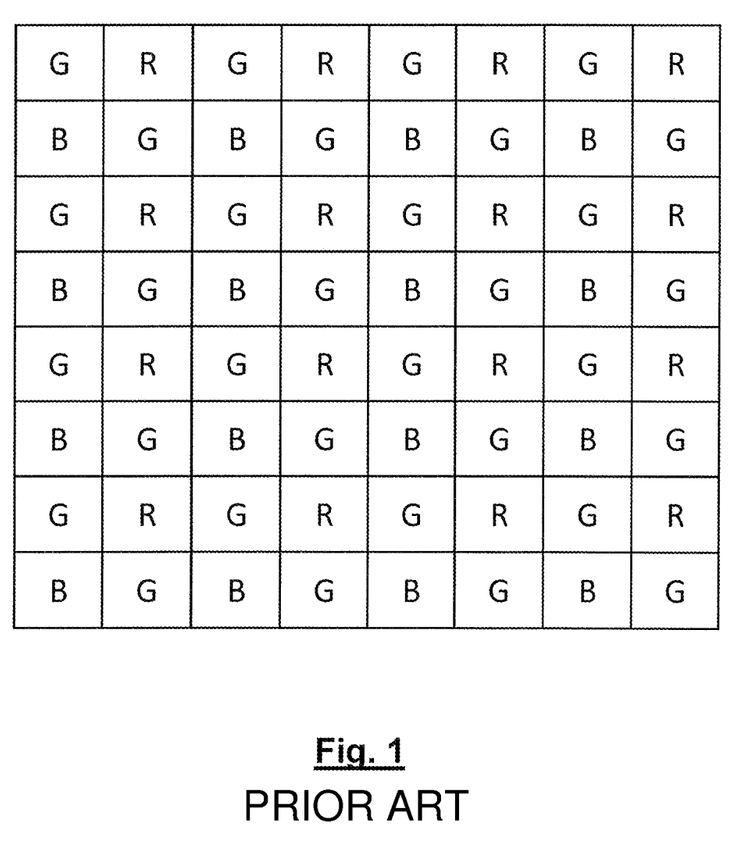
FIG. 1 diagrammatically shows a first colour filter array known in the state of the art.

The most widespread colour filter array used at the present time is disclosed in document U.S. Pat. No. 3,971,065 and is shown in FIG. 1.

This array, called the Bayer array, is obtained by periodic repetition of a pattern composed of four elementary filters, namely:

$$F_{Bayer} = \begin{pmatrix} G & R \\ B & G \end{pmatrix} \quad (1)$$

where G is a filter that allows only green to pass, R is a filter that allows only red to pass and B is a filter that allows only blue to pass. Pixels located under the elementary G,R,B filters are called green, red and blue filters respectively. It can be seen that the Bayer array is composed of 50% of green pixels, 25% red pixels and 25% blue pixels.

The operation consisting of reconstructing a colour image from the intensity received by the different pixels in the sensor is called demosaicking. This demosaicking operation has been studied intensely in the literature, for example in the article by D. Alleyson et al. entitled "Frequency selection demosaicking: a review and a look-ahead", published in Proc. of IS&T/SPIE VCIP, San Jose, Calif., January 2008.

Other colour filter arrays have been disclosed to improve the sensitivity of the sensor under low illumination conditions. Most of these arrays use additional pixels called white pixels, also called transparent, neutral or panchromatic pixels. They can be used to obtain a luminance signal in addition to the chrominance signal. Examples of such arrays are given in application WO-A-2007/089416.

Figure 2:
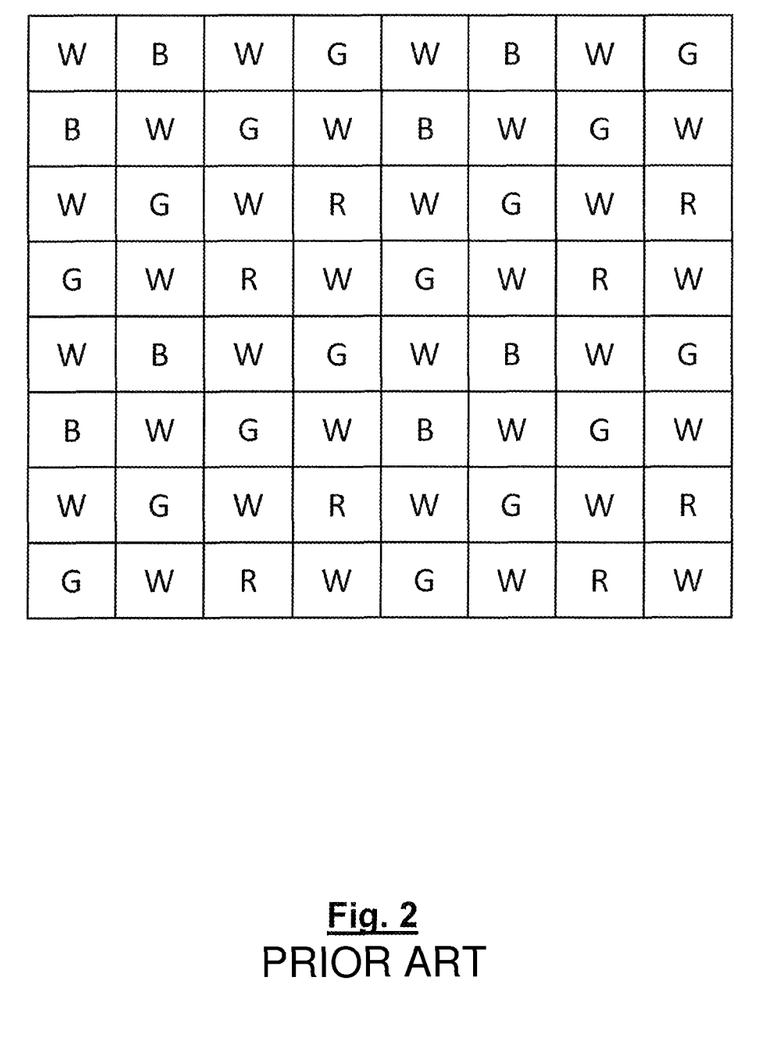
FIG. 2 diagrammatically shows a second colour filter array known in the state of the art.

A frequently used filter array to obtain good sensitivity under low illumination conditions is the so-called Kodak™ array generated by the basic pattern:

$$F_{Kodak} = \begin{pmatrix} W & B & W & G \\ B & W & G & W \\ W & G & W & R \\ G & W & R & W \end{pmatrix} \quad (2)$$

in which the elements R,G,B have the same meaning as above and W refers to a white pixel, in other words lack of chromatic filtering. This filter array is shown in figure FIG. 2.

A first simple solution to further improve the sensitivity of the sensor under low illumination conditions is to make use of the sensor response in the near infrared. However, most image acquisition devices comprise an infrared cut-off filter at the input, to reduce output noise from the CCD or CMOS sensor. Firstly, elementary sensors frequently used at the present time are made of silicon and consequently are sensitive to the near infrared, and secondly elementary colour filters placed in front of the different pixels cannot efficiently block off the infrared part of the spectrum.

Document JP-A-2010062604 discloses the use of infrared pixels in addition to colour pixels, colour pixels being used for day vision and the infrared pixels for night vision. Therefore, the sensor cannot be protected by an infrared input filter in this case. The result is high noise when the sensor is operating in day vision.

The purpose of this invention is to disclose an image acquisition system capable of functioning in day vision and in night vision with a good signal-to-noise ratio.

Presentation of the Invention

This invention is defined by an image acquisition device comprising a sensor composed of an array of photosensitive elements called pixels, an array of elementary filters covering said sensor, each elementary filter being associated with a corresponding pixel, and processing means. This device is special in that:

the elementary filter array comprises primary colour filters where a primary colour filter only transmits one primary colour, filters transmitting the entire visible spectrum called panchromatic filters, and infrared filters transmitting the near infrared, the panchromatic filters representing at least 50% of said elementary filters;

processing means are designed to:

calculate an average luminance on a set of panchromatic pixels to determine if at least one sensor zone is under low or high illumination conditions;

if said zone is under low illumination conditions, form a monochrome image of said zone using the panchromatic pixels;

if said zone is under high illumination conditions, form a colour image of said zone using primary colour pixels and subtract an infrared image from said zone obtained from infrared pixels.

Advantageously, the monochrome image of said zone is obtained by interpolation of panchromatic pixels forming part of this zone.

Similarly, the colour image of said zone is obtained by combination of primary colour images of said zone, a primary colour image being obtained by interpolation of primary colour pixels of said zone.

Finally, the infrared image of said zone may be obtained by interpolation of infrared pixels of said zone.

Advantageously, panchromatic filters represent at least 75% of the elementary filters.

According to one advantageous embodiment, the elementary filter array is generated by two-dimensional periodic repetition of the following pattern:

$$F_{d\&n} = \begin{pmatrix} R & W & G & W \\ W & W & W & W \\ IR & W & B & W \\ W & W & W & W \end{pmatrix}$$

where R,G,B represent transmission filters in the red, the green and blue respectively, IR is an infrared filter and W is a panchromatic filter, the pattern being defined within one permutation of R,G,B,IR.

According to a second advantageous embodiment, the elementary filter array is generated by two-dimensional periodic repetition of the following pattern:

$$F_{d\&n} = \begin{pmatrix} Ye & W & Ma & W \\ W & W & W & W \\ IR & W & Cy & W \\ W & W & W & W \end{pmatrix}$$

where Ye,Ma,Cy represent transmission filters in yellow, magenta and cyan respectively, IR is an infrared filter and W is a panchromatic filter, the pattern being defined within one permutation of Ye,Ma,Cy,IR.

According to a third advantageous embodiment, the elementary filter array is generated by a two-dimensional periodic repetition of the following pattern:

$$F_{d\&n} = \begin{pmatrix} W & R & W & G \\ R & W & IR & W \\ W & G & W & B \\ IR & W & B & W \end{pmatrix}$$

where R,G,B represent transmission filters in the red, green and blue respectively, IR is an infrared filter and W is a panchromatic filter, the pattern being defined within one permutation of R,G,B,IR.

According to a fourth advantageous embodiment, the elementary filter array is generated by a two-dimensional periodic repetition of the following pattern:

$$F_{d\&n} = \begin{pmatrix} W & Ye & W & Ma \\ Ye & W & IR & W \\ W & Ma & W & Cy \\ IR & W & Cy & W \end{pmatrix}$$

where Ye,Ma,Cy represent transmission filters in the yellow, magenta and cyan respectively, IR is an infrared filter and W is a panchromatic filter, the pattern being defined within one permutation of Ye,Ma,Cy,IR.

Preferably, the processing means determine that said zone has low illumination if the average luminance on all panchromatic pixels in said zone is less than a first threshold and said zone has high illumination if the average luminance on all panchromatic pixels in said zone is higher than a second threshold, the second threshold being higher than the first threshold.

If the average of the luminance on all panchromatic pixels in said zone is between the first and second thresholds, the processing means can make a combination of the monochrome image and the colour image of said zone.

When the sensor zone is the entire sensor, the processor means determine if the sensor is under low illumination or high illumination conditions.

Alternately, the monochrome image of the sensor is segmented into homogeneous regions and the processing means operate independently on each homogeneous zone of the sensor.

BRIEF DESCRIPTION OF THE DRAWINGS

Other characteristics and advantages of the invention will become clear after reading the description of preferred embodiments of the invention with reference with the attached figures among which.

La FIG. 4A diagrammatically shows an example filter array for an image acquisition device according to a third example embodiment of the invention.

La FIG. 4B diagrammatically shows an example filter array for an image acquisition device according to a fourth example embodiment of the invention.

DETAILED PRESENTATION OF PARTICULAR EMBODIMENTS

We will once again consider an image acquisition device in the following comprising a sensor composed of an array of elementary photosensitive sensors (CCD or CMOS) also called pixels, and an elementary filter array covering the sensor, each elementary filter being associated with a corresponding pixel.

Figure 7:
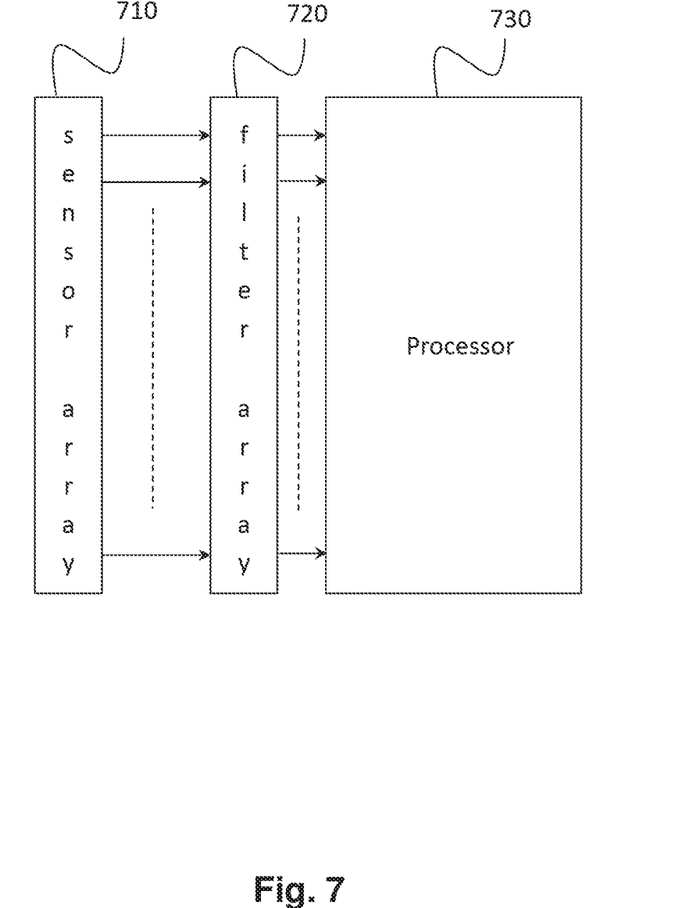
FIG. 7 diagrammatically shows an image acquisition device according to the present invention.

Such an image acquisition device is illustrated in FIG. 7. It shows the sensor, 710, composed of an array of elementary photosensitive sensors, an array of elementary filters, 720, covering said sensor, each elementary filter being associated with a corresponding pixel, and a processor, 730.

As detailed below, the array of elementary filters comprises primary colour filters, where a primary colour filter only transmits one primary colour, filters transmitting the entire visible spectrum called panchromatic filters, and infrared filters transmitting the near infrared, the panchromatic filters representing at least 50% of said elementary filters.

Furthermore, the processor is configured to:
calculate an average luminance on a set of panchromatic pixels to determine if at least one sensor zone is under low or high illumination conditions;
if said zone is under low illumination conditions, form a monochrome image of said zone using the panchromatic pixels;
if said zone is under high illumination conditions, form a colour image of said zone using primary colour pixels and subtract an infrared image from said zone obtained from infrared pixels.

Elementary filters in the array are transmission filters of three different types: colour filters, transparent (or panchromatic) filters and infrared filters.

Colour elementary filters allow a set of primary colours to pass through them enabling additive or subtractive synthesis of all colours in the visible spectrum. Thus colour filters may be R,G,B filters as defined in the introduction in the case of an additive synthesis, or Ye,Ma,Cy filters where Ye allows yellow to pass, Ma allows magenta to pass, and Cy allows cyan to pass, in the case of a subtractive synthesis. Other primary colour bases could be envisaged by those skilled in the art without going outside the scope of this invention.

Panchromatic elementary filters allow the entire visible spectrum to pass. In practice they may be made by simple stencils in the array or transparent filters (in the visible). In this case pixels located under these panchromatic elementary filters receive unfiltered light.

Infrared elementary filters only allow a spectral band in the near infrared to pass, for example in the [700 nm-1700 nm] band, and more particularly in the [700 nm-1100 nm] band.

Elementary filters are advantageously arranged in the form of a periodically repeating pattern along two distinct directions (usually orthogonal) in the plane of the sensor.

The elementary filters may be made from a polymer material or may be interference filters in a manner known in itself.

Preferably, the proportion of panchromatic elementary filters in the array will be greater than or equal to 50%, the other elementary filters (colour filters and infrared filters) being distributed in equal proportions. Advantageously, the proportion of panchromatic elementary filters will be equal to 75% and the proportion of each of the other elementary filters will be 6.25%.

Figure 3A:
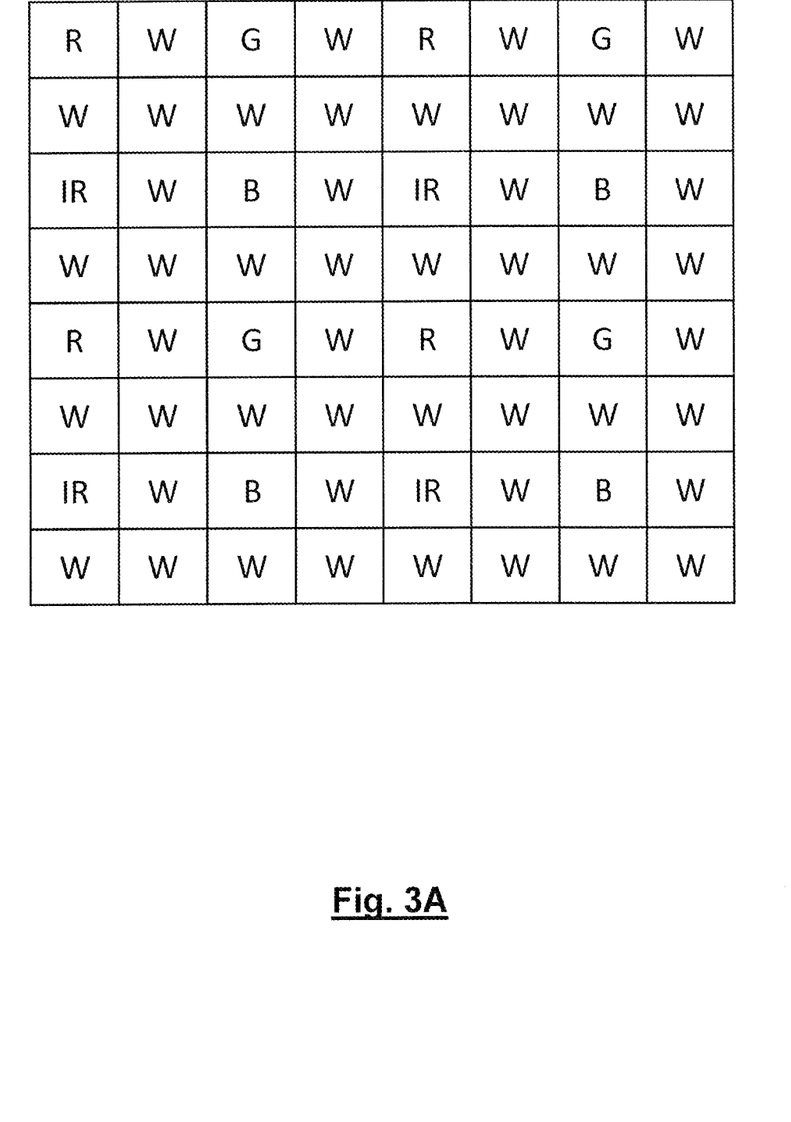
FIG. 3A diagrammatically shows an example filter array for an image acquisition device according to a first example embodiment of the invention.

FIG. 3A shows an array of elementary filters for an image acquisition system according to a first example embodiment of the invention. There is one sensor pixel for each elementary filter.

In this case, the colour elementary filters are R,G,B filters. Infrared elementary filters are denoted IR and panchromatic filters are denoted W.

It will be noted that the elementary array is generated by a two-dimensional periodic repetition of the basic 4×4 pattern:

$$F_{d\&n} = \begin{pmatrix} R & W & G & W \\ W & W & W & W \\ IR & W & B & W \\ W & W & W & W \end{pmatrix} \quad (3)$$

Variants of this array can be obtained by permutation of the R,G,B,IR filters in the pattern (3).

Figure 3B:
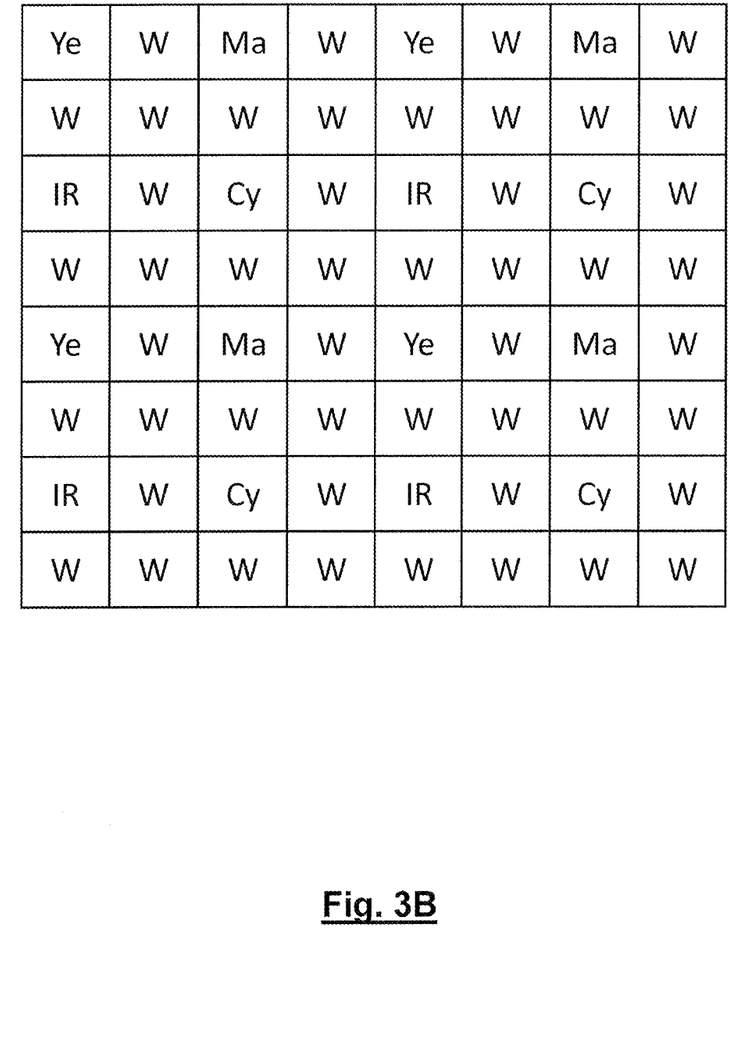
FIG. 3B diagrammatically shows an example filter array for an image acquisition device according to a second example embodiment of the invention.

FIG. 3B shows an array of elementary filters for an image acquisition system according to a second example embodiment of the invention.

In this case, the colour elementary filters are the Ye,Ma, Cy filters and the basic pattern is then:

$$F_{d\&n} = \begin{pmatrix} Ye & W & Ma & W \\ W & W & W & W \\ IR & W & Cy & W \\ W & W & W & W \end{pmatrix} \quad (4)$$

As in the first example, variants of this array may be obtained by permutation of the Ye,Ma,Cy,IR filters in the array (4).

In the examples in FIGS. 3A and 3B, it will be noted that the proportion of panchromatic filters in the array is 75% and the proportion of each colour and infrared filter is 6.25%.

Figure 4A:
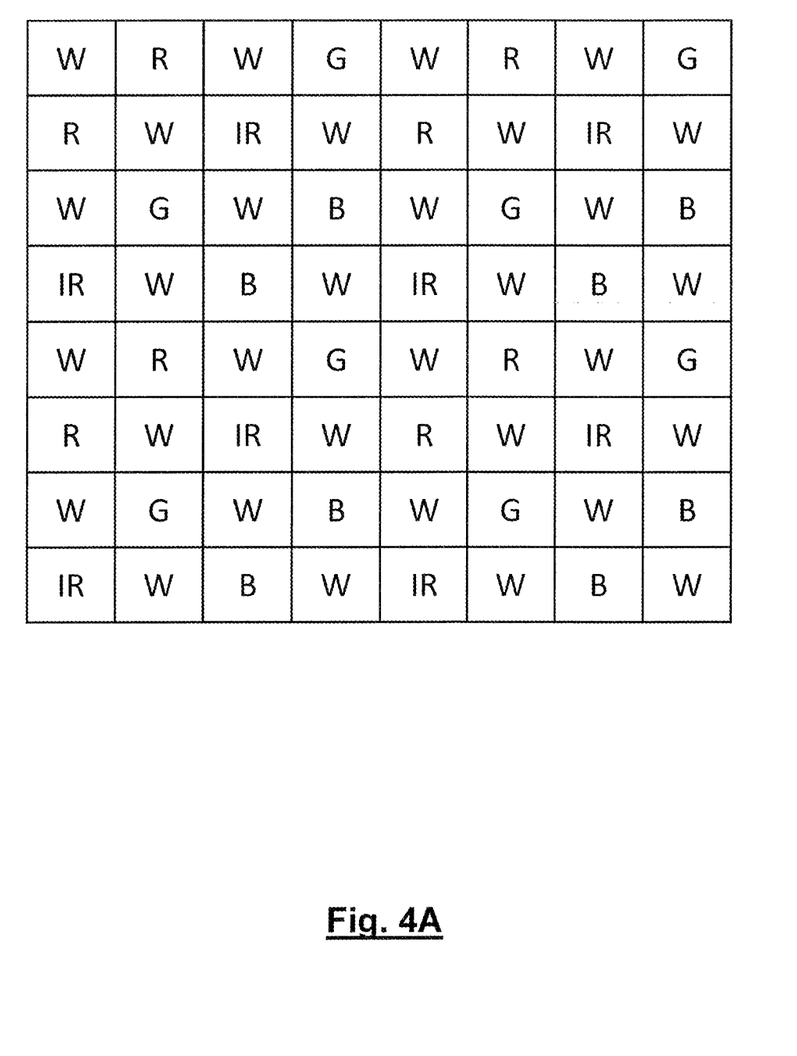

FIG. 4A shows an elementary filter array for an image acquisition system according to a third example embodiment of the invention.

The elementary filters used in the array are R,G,B,IR filters, the basic pattern in this case being:

$$F_{d\&n} = \begin{pmatrix} W & R & W & G \\ R & W & IR & W \\ W & G & W & B \\ IR & W & B & W \end{pmatrix} \quad (5)$$

As in the first example, variants of this array may be obtained by permutation of the R,G,B,IR filters in the pattern (5).

Figure 4B:
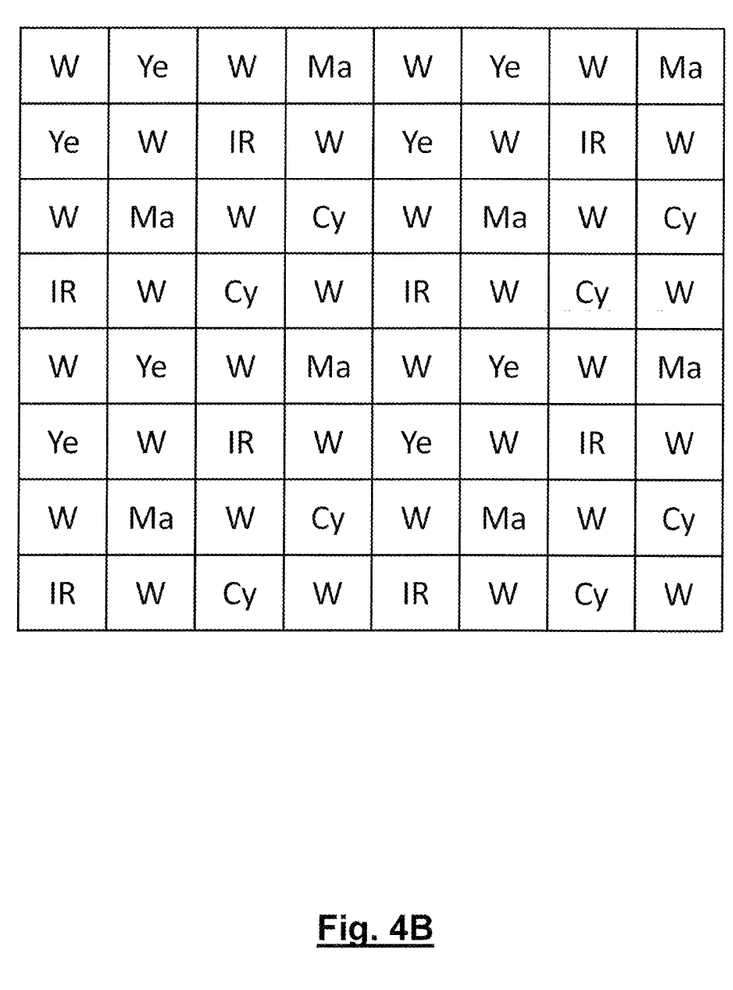

FIG. 4B shows an elementary filter array for an image acquisition system according to a fourth example embodiment of the invention.

The elementary filters making up the array are the Ye,Ma, Cy,IR filters and the basic pattern is:

$$F_{d\&n} = \begin{pmatrix} W & Ye & W & Ma \\ Ye & W & IR & W \\ W & Ma & W & Cy \\ IR & W & Cy & W \end{pmatrix} \quad (6)$$

As in the second example, variants of this array can be obtained by permutation of Ye,Ma,Cy,IR filters in the pattern (6).

In the examples in FIGS. 4A and 4B, it will be noted that the proportion of panchromatic filters in the array is only 50% and the proportion of each colour and infrared filter is 12.5%.

Figure 5:
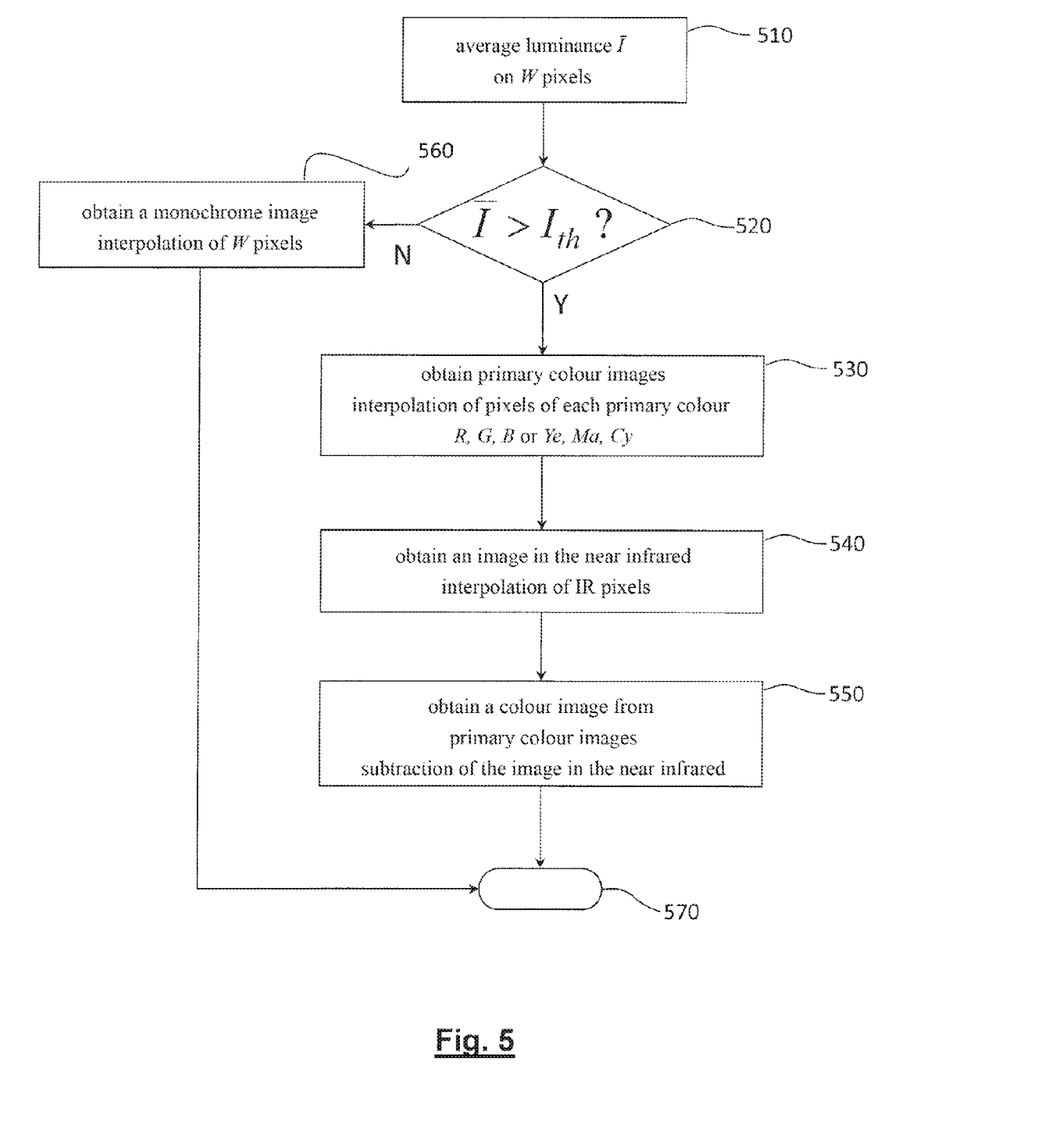
FIG. 5 diagrammatically shows processing of pixels for an image acquisition device according to a first embodiment of the invention.

FIG. 5 diagrammatically shows processing of pixels in an image acquisition system according to a first embodiment of the invention.

In the following, an operation on the pixels will be understood as an operation on the signals received by these pixels.

In a first step 510, the average luminance $\bar{I}$ of the image acquired by the device is estimated by calculating the average of the panchromatic pixels.

In 520, the average thus obtained is compared with a predetermined threshold value, $I_{th}$. The acquisition device operates in day (or high illumination) mode if the average exceeds said threshold value, otherwise it operates in night (low illumination) mode.

If the acquisition device is operating in day mode, colour pixels are interpolated in 530 so as to obtain one image for each primary colour, R,G,B or Ye,Ma,Cy. More precisely, as seen above, since the proportion of pixels of a given colour is relatively small, the value of the missing pixels is obtained by interpolation of nearby pixels present in the array. For example, with reference to FIG. 3A, the blue pixel 310 is missing (because it is located under a red elementary filter), and is therefore obtained by interpolation between the four adjacent blue pixels 311, 312, 313, 314.

Primary colour images may optionally be processed for image sharpening. For example, a monochrome image can be obtained by interpolating panchromatic pixels and this monochrome image can be combined with each primary colour image, possibly after high pass filtering. The proportion of panchromatic pixels in the array is higher than the proportion of colour pixels, therefore the resolution of the primary colour images is improved.

In step 540, an image in the near infrared is obtained by interpolation between infrared pixels in the array using the same principle as described above for colour pixels.

In step 550, the primary colour images are added (for an additive synthesis) to obtain a colour image and the infrared image is subtracted from it pixel by pixel. More generally, primary colour images are combined to obtain a colour image. Subtraction of the infrared image can considerably improve the signal to noise ratio. If necessary, the infrared image weighted by weighting factors (similar or identical) is subtracted from each primary colour image to obtain noise free primary colour images before summating them (or more generally combining them), so as to prevent saturation problems. The resulting image can then be displayed or stored in a memory for subsequent processing.

Step 560 corresponds to operation in night mode (or under low illumination). In this mode, a monochrome image is obtained by interpolation of panchromatic pixels. Since there is a majority of panchromatic pixels in the array, a high degree of resolution is obtained. This image can be displayed or stored in a memory for subsequent processing.

In all cases, processing terminates at 570.

According to the first embodiment, processor 710 of the image acquisition device is configured to carry out processing steps 510-570 described above.

It can be understood that the processing of pixels described above is very different if the image acquisition device is operating in day mode or in night mode, and switching from one mode to the other is made by comparison of the average luminance with a predetermined threshold.

According to one first variant of this embodiment, switching from one mode to the other takes place with hysteresis to avoid switching noise (chattering). To achieve this, a first luminance threshold is set for the transition from day mode to night mode and a second luminance threshold is set for the transition from night mode to day mode, the first threshold being chosen to be less than the second threshold.

According to a second variant of the first embodiment, switching from one mode to the other takes place progressively passing through a transition phase. Thus, the image acquisition device operates in night mode when the average luminance is less than a first threshold and in day mode when it is greater than a second threshold, the second threshold being chosen to be higher than the first threshold. When the average luminance is between the first and the second thresholds, the image acquisition device performs a linear combination of the image obtained by processing in day mode and that obtained by processing in night mode, the weighting coefficients being given by the differences in average luminance with the first and second thresholds respectively.

Figure 6:
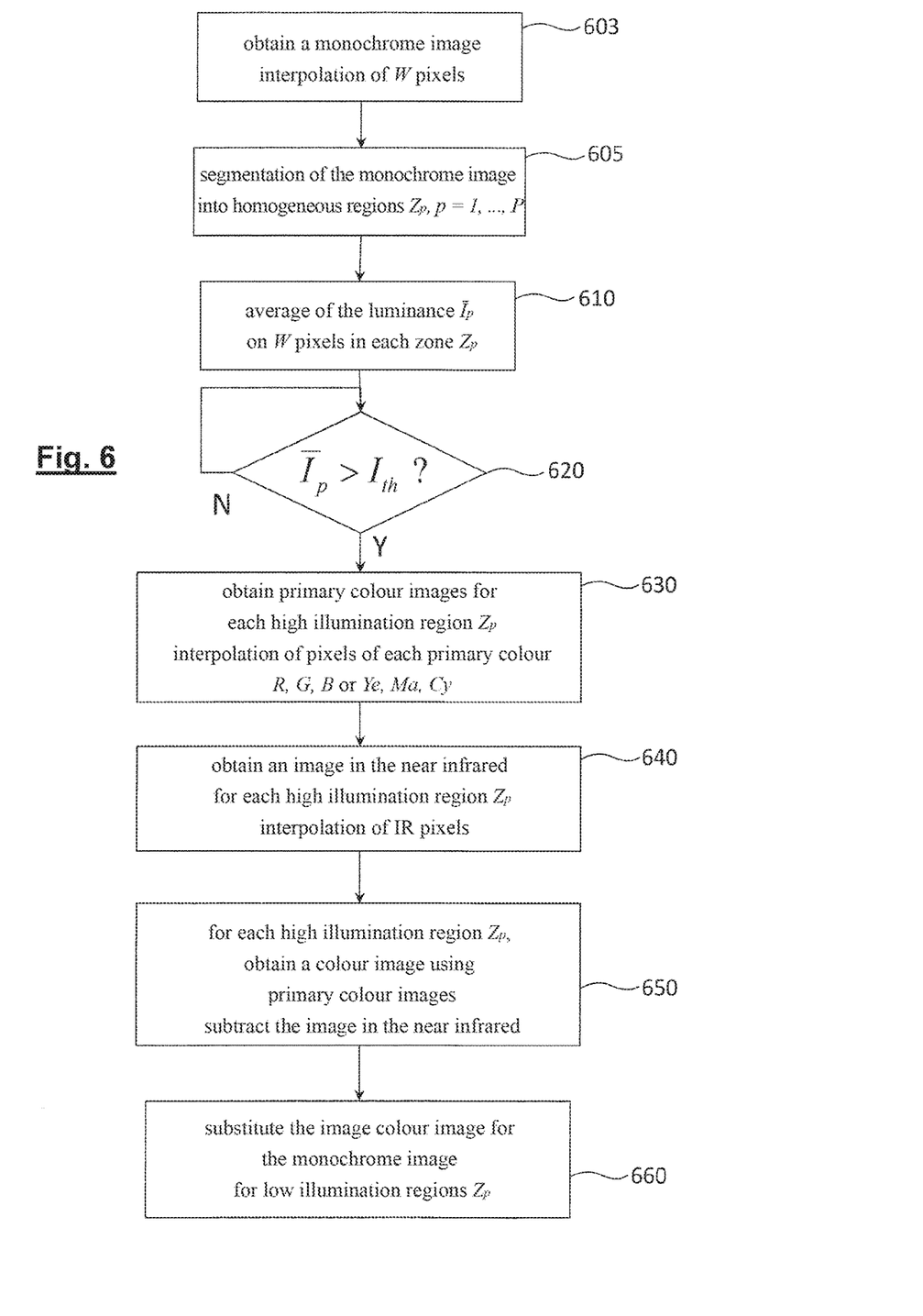
FIG. 6 diagrammatically shows processing of pixels for an image acquisition device according to a second embodiment of the invention.

FIG. 6 diagrammatically shows processing of pixels in an image acquisition device according to a second embodiment of the invention.

Unlike the first embodiment, switching between day mode (or high illumination) and night mode (low illumination) is active on homogeneous regions of an acquired image, each homogeneous region being processed separately.

In step 603, a monochrome image is obtained by interpolating panchromatic pixels. More precisely, for each missing panchromatic pixel in the array (for example colour or infrared pixel), an intensity is calculated from nearby panchromatic pixels.

In step 605, the monochrome image thus obtained is segmented into homogeneous regions. This can be done using a switching technique known in the state of the art, for example like that described in the article by S. Tripathi et al. entitled "Image Segmentation: a review" published in International Journal of Computer Science and Management Research, vol. 1, No. 4, November 2012, pp. 838-843. The result obtained is thus P homogeneous regions.

In step 610, the average luminance denoted $\bar{I}_p$ is calculated for each region $Z_p$, p=1, . . . , P.

In step 620, the averages of the luminance thus obtained are compared with a predetermined threshold value. If the average $\bar{I}_p$ exceeds said threshold value, the region $Z_p$ is considered to be high illumination. Conversely, if the average $\bar{I}_p$ is less than said threshold value, the region $Z_p$ is considered to be low illumination.

Note that for a given zone, the distinction between low illumination and high illumination depends on the average of the luminance as obtained from panchromatic pixels. In other words, the average luminance is obtained on the entire spectrum.

In step 630, regions with high illumination are processed. For each high illumination region, colour pixels belonging to this region are interpolated so as to obtain an image for this region for each primary colour R,G,B or Ye,Ma,Cy.

In step 640, an image in the near infrared of each high illumination region is obtained by interpolating infrared pixels belonging to this region.

In step 650, primary colour images are combined for each high illumination region (simple summation in the case of an additive synthesis) and the infrared image is subtracted pixel by pixel. The result obtained is thus colour pixels forming a colour image for each high illumination region.

In step 660, the panchromatic pixels of high illumination regions in the monochrome image obtained in step 603 are replaced by colour pixels obtained in step 650. Alternately, a linear combination of the panchromatic pixel (in other words the pixel in the monochrome image) and the colour pixel obtained in step 650 is made for each pixel belong to a high illumination region. Thus, for low illumination regions, the monochrome image (obtained in step 603) is superposed with the colour image (obtained in 650).

According to the second embodiment, processor 710 of the image acquisition device is configured to carry out processing steps 603, 605, 610-660 described above.

As in the first embodiment, in a first variant, two distinct thresholds can be used, a first threshold to detect when a region changes from a low illumination level to a high illumination level, and a second threshold to determine when a region changes from a high illumination level to a low illumination level, the first threshold being less than the second threshold.

It would also be possible in a second variant to use a transition phase between the two thresholds. In other words, below the first threshold the region is represented in monochrome mode by interpolation of panchromatic pixels, and above the second threshold the region is represented in colour, and between the two thresholds the region may be represented by a linear combination of the monochrome image and the colour image.

It can thus be understood that there is an image acquisition device capable of functioning independently of illumination conditions while having a very good signal to noise ratio.

According to another variant not shown of the second embodiment, when test 620 has determined that a zone has low illumination, it is determined if the intensity of infrared pixels forming part of this zone is greater than a predetermined IR threshold. Infrared pixels for which the intensity is greater than the IR threshold are then represented in false colours superposed with the monochrome image of the zone. Thus, if a sub-zone of the low illumination zone has high intensity in the infrared domain, it can be easily identified in the monochrome image of the zone in question. Also alternately, the criterion for switching between a monochrome display and a display in false colours can be made by homogenous sub-zones of the low illumination zone. In this case, the low illumination zone is firstly segmented based on infrared pixels, after interpolation, using the same principle that was described with relation to steps 603 and 605. For each homogeneous sub-zone as defined above, the average intensity of infrared pixels in this sub-zone is calculated and is compared with the above-mentioned IR threshold. When this average is greater than the IR threshold, the sub-zone is represented with false colours superposed on the monochrome image of the zone. The image of the sub-zone in false colours is obtained by interpolation of infrared pixels in this sub-zone. It will thus be understood that in this case, the image of the low illumination zone but with sub-zones with high infrared intensity, is obtained by a combination of the panchromatic pixels (monochrome part) and infrared pixels (part in false colours) excluding elementary colour pixels (RGB) or (Cyan, Magenta, Yellow).

What is claimed is:

1. Image acquisition device comprising a sensor composed of an array of photosensitive elements called pixels, an array of elementary filters covering said sensor, each elementary filter being associated with a corresponding pixel, and a processor, wherein:
    the elementary filter array comprises primary colour filters, where a primary colour filter only transmits one primary colour, filters transmitting the entire visible spectrum called panchromatic filters, and infrared filters transmitting the near infrared, the panchromatic filters representing at least 50% of said elementary filters;
    the processor configured to:
    calculate an average luminance on a set of panchromatic pixels to determine if at least one sensor zone is under low or high illumination conditions;
    if said zone is under low illumination conditions, form a monochrome image of said zone using the panchromatic pixels;
    if said zone is under high illumination conditions, form a colour image of said zone using primary colour pixels and subtract an infrared image from said zone obtained from infrared pixels.

2. Image acquisition device according to claim 1, wherein the monochrome image of said zone is obtained by interpolation of panchromatic pixels forming part of this zone.

3. Image acquisition device according to claim 1, wherein the colour image of said zone is obtained by combination of primary colour images of said zone, a primary colour image being obtained by interpolation of primary colour pixels of said zone.

4. Image acquisition device according to claim 1, wherein the infrared image of said zone is obtained by interpolation of infrared pixels of said zone.

5. Image acquisition device according to claim 1, wherein panchromatic filters represent at least 75% of the elementary filters.

6. Image acquisition device according to claim 5, wherein the elementary filter array is generated by two-dimensional periodic repetition of the following pattern:

$$F_{d\&n} = \begin{pmatrix} R & W & G & W \\ W & W & W & W \\ IR & W & B & W \\ W & W & W & W \end{pmatrix}$$

where R,G,B represent transmission filters in the red, the green and blue respectively, IR is an infrared filter and W is a panchromatic filter, the pattern being defined within one permutation of R,G,B,IR.

7. Image acquisition device according to claim 5, wherein the elementary filter array is generated by two-dimensional periodic repetition of the following pattern:

$$F_{d\&n} = \begin{pmatrix} Ye & W & Ma & W \\ W & W & W & W \\ IR & W & Cy & W \\ W & W & W & W \end{pmatrix}$$

where Ye, Ma, Cy represent transmission filters in yellow, magenta and cyan respectively, IR is an infrared filter and W is a panchromatic filter, the pattern being defined within one permutation of Ye, Ma, Cy, IR.

8. Image acquisition device according to claim 1, wherein the elementary filter array is generated by a two-dimensional periodic repetition of the following pattern:

$$F_{d\&n} = \begin{pmatrix} W & R & W & G \\ R & W & IR & W \\ W & G & W & B \\ IR & W & B & W \end{pmatrix}$$

where R,G,B represent transmission filters in the red, green and blue respectively, IR is an infrared filter and W is a panchromatic filter, the pattern being defined within one permutation of R,G,B,IR.

9. Image acquisition device according to claim 1, wherein the elementary filter array is generated by a two-dimensional periodic repetition of the following pattern:

$$F_{d\&n} = \begin{pmatrix} W & Ye & W & Ma \\ Ye & W & IR & W \\ W & Ma & W & Cy \\ IR & W & Cy & W \end{pmatrix}$$

where Ye, Ma, Cy represent transmission filters in the yellow, magenta and cyan respectively, IR is an infrared filter and W is a panchromatic filter, the pattern being defined within one permutation of Ye, Ma, Cy, IR.

10. Image acquisition device according to claim 1, wherein the processor determines that said zone has low illumination if the average luminance on all panchromatic pixels in said zone is less than a first threshold and said zone has high illumination if the average luminance on all panchromatic pixels in said zone is higher than a second threshold, the second threshold being higher than the first threshold.

11. Image acquisition device according to claim 10, wherein if the average of the luminance on all panchromatic pixels in said zone is between the first and second thresholds, the processor makes a combination of the monochrome image and the colour image of said zone.

12. Image acquisition device according to claim 1, wherein the sensor zone is the entire sensor and the processor determines if the sensor is under low illumination or high illumination conditions.

13. Image acquisition device according to claim 1, wherein the monochrome image of the sensor is segmented into homogeneous regions and the processor operates independently on each homogeneous zone of the sensor.

14. Image acquisition device according to claim 1, wherein when a zone is under low illumination conditions, a test is performed to determine if the intensity of infrared pixels forming part of this zone is greater than a predetermined IR threshold, and if so, Infrared pixels represented in false colours are superposed with the monochrome image of this zone.

15. Image acquisition device according to claim 1, wherein when a zone is under low illumination conditions, sub-zones with homogeneous intensity in the infrared spectrum are identified in this zone, and for each sub-zone thus identified, it is determined if the average intensity of infrared in this sub-zone is greater than a predetermined IR threshold, and if so, this sub-zone is represented by a false colour image based on infrared pixels in this sub-zone, the false colour image of said sub-zone then being represented superposed with the monochrome image of the zone of which if forms part.

16. Image acquisition device according to claim 1, wherein the false colour image of said sub-zone is obtained by interpolation of the infrared pixels forming part of this sub-zone.

17. Image acquisition device according to claim 1, wherein the infrared filters transmit the 700nm-1100nm band.

18. Image acquisition device according to claim 1, wherein the infrared filters transmit the 700nm-1700nm band.

* * * * *